United States Patent
Takeuchi et al.

[11] Patent Number: 5,874,030
[45] Date of Patent: Feb. 23, 1999

[54] METHOD OF MANUFACTURING FOAMED PRODUCT WITH SKIN AND METHOD OF MANUFACTURING SAID SKIN

[75] Inventors: Nobuo Takeuchi; Taishi Kitano; Hiyoshi Ishikawa, all of Aichi; Hiroyuki Iwane, Shiga, all of Japan

[73] Assignee: Inoac Corporation, Aichi, Japan

[21] Appl. No.: 706,227

[22] Filed: Sep. 4, 1996

[30] Foreign Application Priority Data

Sep. 6, 1995 [JP] Japan .................................... 7-255487

[51] Int. Cl.$^6$ ........................... B29C 44/18; B68G 11/04
[52] U.S. Cl. .......................... 264/46.6; 264/46.9; 29/91.1
[58] Field of Search ................................. 264/46.5, 46.6, 264/46.7, 46.9; 112/475.04; 29/91.1

[56] References Cited

U.S. PATENT DOCUMENTS

| | | | |
|---|---|---|---|
| 4,891,081 | 1/1990 | Takahashi et al. | 264/46.6 |
| 4,908,170 | 3/1990 | Kurimoto | 264/46.6 |
| 5,004,572 | 4/1991 | Kurimoto | 264/46.6 |

FOREIGN PATENT DOCUMENTS 4-40181  7/1992  Japan .

Primary Examiner—Allan R. Kuhns
Attorney, Agent, or Firm—Sughrue, Mion, Zinn, Macpeak & Seas, PLLC

[57] ABSTRACT

A method of manufacturing a skin for foamed product involves the steps of: (a) not only preparing a plurality of flat skin forming pieces 2 to 5 by defining a skin 13 for covering an annular foamed body Y into a plurality of skins in radial directions and flatly developing the thus defined skins 131 to 134 while cutting apart at a single position along a circumference, and forming an opening 2a on a single skin surface out of these flat skin forming pieces; (b) overlapping adjacent flat skin forming pieces in such a manner that decorated surfaces of the skin forming pieces confront each other to thereby form a skin body 6 while joining side edges of the flat skin forming pieces 2 to 5 together; and (c) reversing the skin body 6 so that the front side thereof faces outward, joining diametrically opposite portions of both opening end edges of the skin body after such opening end edges have been pulled out of the opening 2a inside out, and pushing the joined opposite portions back through the opening 2a to thereby form an annular skin body 7 having a closed cross section with the front side thereof facing outward.

11 Claims, 12 Drawing Sheets

METHOD OF MANUFACTURING FOAMED PRODUCT WITH SKIN AND METHOD OF MANUFACTURING SAID SKIN

BACKGROUND OF THE INVENTION

1. Field of the Invention

The invention relates to a method of manufacturing an annular skin for foamed product with skin and a method of manufacturing a foamed product using such skin.

2. Description of the Related Art

Some headrests that are mounted on a top of the backrests of seats in automobiles or the like have a hole. Such a headrest with the hole is usually prepared as a foamed product with skin with the middle portion thereof hollowed out so that the back part of the head can rest therein. The entire part of the foamed product is covered with a skin.

A method of manufacturing headrests with the hole of this type involves the steps not only of first preparing a foamed body and then covering a skin over the foamed body, but also of arranging a fastener to the outer periphery. When such a method is employed, the costs of manufacture of the headrests become elevated. Another method of manufacturing headrests with an opening involves skin integrated foaming while using no fastener. However, this method has a difficulty in concealing the outlet seams.

Under such circumstances, e.g., Examined Japanese Patent Publication No. Hei. 4-40181 proposes a method of forming an annular headrest by stitching skin forming pieces one by one.

The art disclosed in the aforementioned publication is characterized as joining the cubic cylindrical opening edges of split pieces of a skin body together and, therefore, this art involves a cumbersome and time-consuming operation. In addition, when the skin forming pieces formed in cylindrical form are joined together from one piece to another, a special sewing machine such as a spot sewing machine must disadvantageously be employed because the diameter of the cylindrical body is small.

SUMMARY OF THE INVENTION

The invention has been made to overcome the aforementioned problems, and therefore an object of the invention is to provide a method of manufacturing a skin for foamed product and a method of manufacturing a foamed product with such skin in a simple way without allowing the outlet seams to be exposed outside nor using any special machine.

To solve the above problems, according to a first aspect of the invention, there is provided a method of manufacturing a skin for foamed product with skin, which involves the steps of: (a) defining a skin for covering an annular foamed body into a plurality of skins in radial directions and cutting apart each defined skin at a single position along a circumference to prepare a plurality of flat skin forming pieces, and forming an opening in one of the flat skin forming pieces; (b) forming a skin body by overlapping adjacent flat skin forming pieces one upon another in such a manner that decorated surfaces of the adjacent flat skin forming pieces confront each other, and joining side edges of the adjacent flat skin forming pieces together; and (c) reversing the skin body so that a front side thereof faces outward, thereafter joining confronting portions of both opening end edges of the skin forming pieces of the skin body together after the opening end edges have been pulled out via the opening inside out, and pushing the confronting portions back via the opening to thereby form an annular skin body having a closed cross section with the front side thereof facing outward.

According to a second aspect of the invention, the skin as defined in the first aspect of the invention is made of fabric skin; and the skin forming pieces and the confronting portions thereof are joined together by stitching.

According to a third aspect of the invention, one of the skin forming pieces is formed by joining two small skin forming pieces, each having a middle portion on a confronting edge side thereof projected; and the opening is formed between the middle portions of the two small skin forming pieces with the middle portions of the two small skin forming pieces unjoined.

According to a fourth aspect of the invention, there is provided a method of manufacturing a foamed product with skin, which involves the steps of: (a) defining a skin for covering an annular foamed body into a plurality of skins in radial directions and cutting apart each defined skin at a single position along a circumference to prepare a plurality of flat skin forming pieces, and forming an opening in one of the flat skin forming pieces; (b) forming a skin body by overlapping adjacent flat skin forming pieces one upon another in such a manner that decorated surfaces of the adjacent flat skin forming pieces confront each other, and joining side edges of the adjacent flat skin forming pieces together; (c) reversing the skin body so that a front side thereof faces outward, thereafter joining confronting portions of both opening end edges of the skin forming pieces of the skin body together after the opening end edges have been pulled out via the opening inside out, and pushing the confronting portions back via the opening to thereby form an annular skin body having a closed cross section with the front side thereof facing outward; and (d) charging a foaming agent into the annular skin body to implement skin integrated foaming.

According to the fifth aspect of the invention, the opening as defined in the fourth aspect of the invention is used as a foaming agent charging port.

According to the sixth aspect of the invention, the foamed product as defined in the fourth or fifth aspect of the invention is a headrest.

According to the invention as defined in the first and fourth aspects of the invention, all the joined portions of the skin forming pieces ate arranged on the back side of the skin. Therefore, the skin is attractive. In addition, both opening end edges of the skin body are pulled out via the opening inside out, and portions close to the portions to be joined of the opening end edges remain flat when such portions are to be joined. Therefore, the joining operation can be performed easily.

In the case where the fabric skin is used and stitched as in the invention as defined in the second aspect of the invention, a special machine such as a spot sewing machine is not involved. An ordinary sewing machine can be used. In addition, since the outlet seams are concealed, a high quality product can be prepared.

According to the invention as defined in the third aspect of the invention, the projecting middle portions are arranged at the opening (in the closed space of the annular skin body) at the time of charging the foaming agent. Therefore, the middle portions are brought into pressure contact with each other by foaming pressure derived from foaming, so that the opening is closed.

According to the fifth aspect of the invention, the opening can be used as the foaming agent charging port. Therefore, it is not necessary to additionally provide a charging port.

The above and other objects and features of the present invention will be more apparent from the following description taken in conjunction with the accompanying drawings.

DETAILED DESCRIPTION OF THE PREFERRED EMBODIMENTS

A description will be given in more detail of preferred embodiments of the present invention with reference to the accompanying drawings.

FIGS. 1 to 20 show one exemplary method of manufacturing a skin for foamed product and one exemplary method of manufacturing a foamed product with such skin according to the invention. The invention is applied to a headrest for automobile as the foamed product with a skin.

Figure 1:
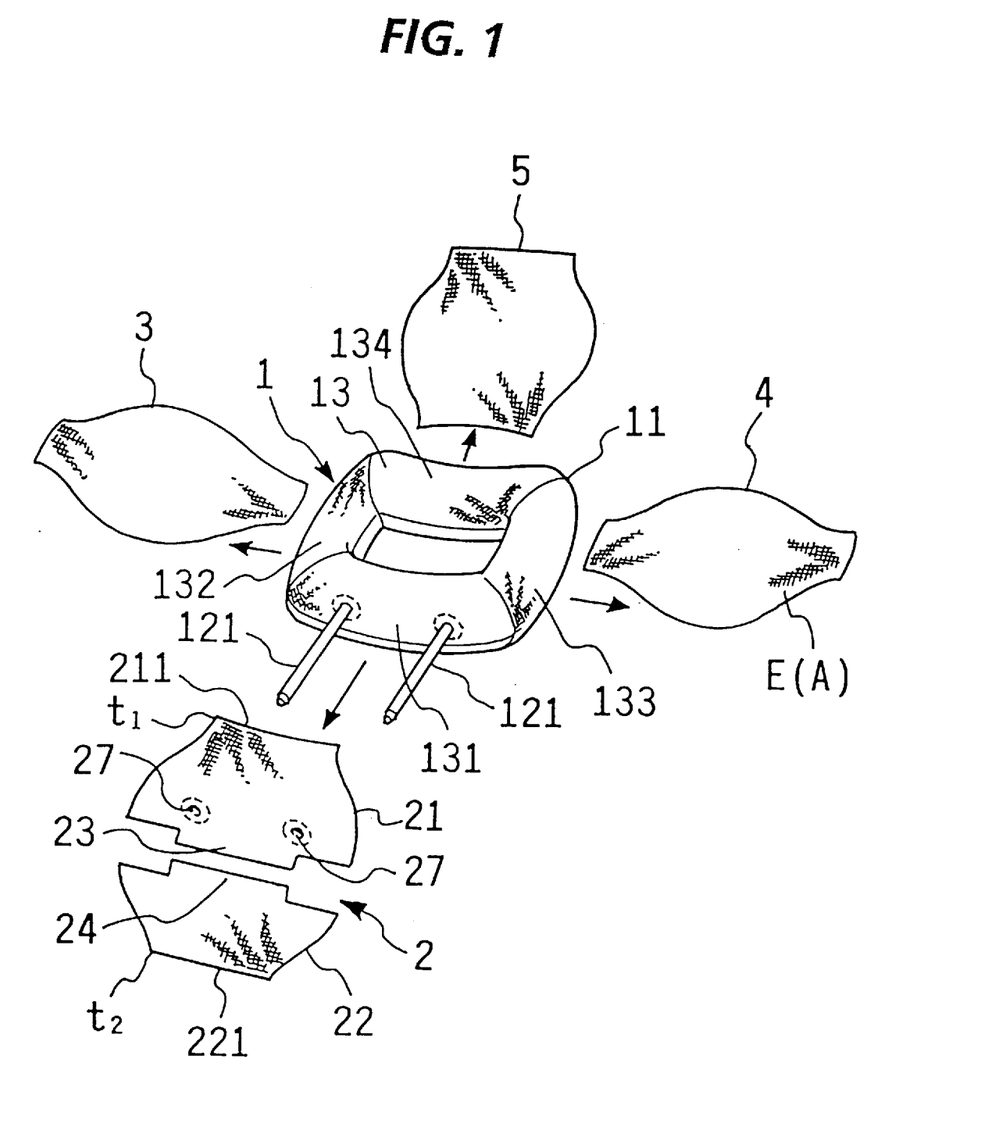
FIG. 1 is a perspective view showing the appearance of a headrest for automobile and the patterning of skin forming pieces.

A headrest 1 as a final foamed product with skin has a substantially squared annular (doughnutlike) shape as viewed from top as a whole and the inner circumferential portion thereof in which the back part of the head of a passenger is to be rested is hollowed out as shown in FIG. 1. From the lower left and right positions of the main body portion 11 of the headrest project legs 121 of a stay so that these legs 121 are fixed to the top of a not shown backrest of a seat.

Figure 20:
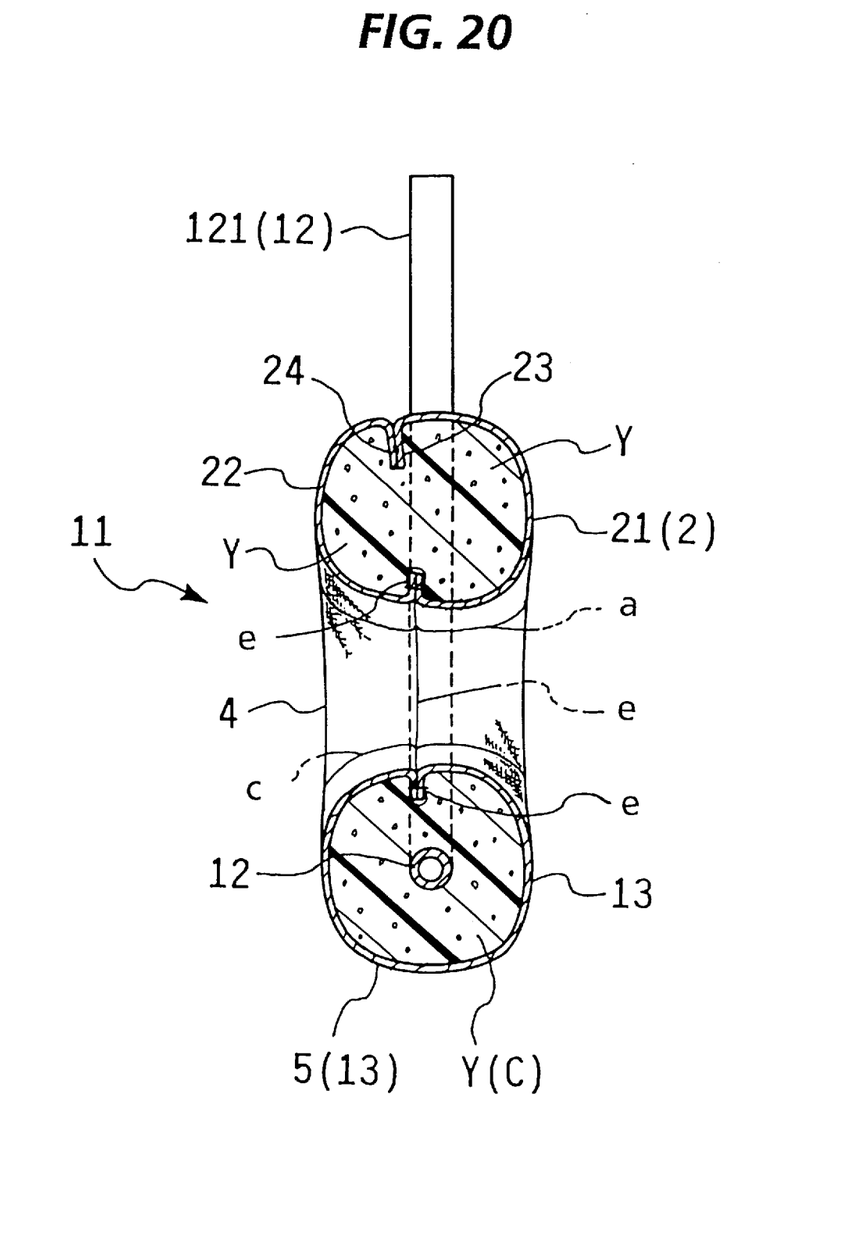
FIG. 20 is a longitudinal sectional view of a foamed product with skin shown in FIG. 1.

The main body portion 11, prepared by covering the surface of a foamed body Y with a fabric skin 13, is a skin integrated foamed product, as shown in FIG. 20. The skin 13 for such foamed product is manufactured by the following process steps.

First, the skin 13 of the main body portion of the headrest 1 is defined into four cylindrical skins 131, 132, 133 and 134, which are a lower side, a left side, a right side, and an upper side. The thus defined cylindrical skins 131 to 134 are further cut apart at an inner circumference of the annular main body portion 11 to prepare four flatly developed skin forming pieces 2, 3, 4, and 5, as shown in FIG. 1. Such skin forming pieces 2 to 5 may be made of, e.g, cut pile fabric or the like, which uses a synthetic fiber such as acrylic or polyamide as the pile yarn and cotton, rayon, or the like as the ground fabric.

Each of these skin forming pieces 2 to 5 is wider in the middle and becomes gradually narrower toward diametrically opposite opening end edges thereof. A predetermined outlet seam is provided for each cut opening end edge in advance. The skin forming piece 2 is split substantially in the middle thereof to form two small skin forming pieces 21, 22. The small skin forming pieces 21, 22 have middle portions 23, 24 of the confronting edges thereof projected in rectangular form. Through holes 27 to which ring pads have been attached are formed on both left and right sides on a surface close to the confronting edge of the small skin forming piece 21. The through holes 27 are arranged to allow the legs 121 of the stay to be inserted thereinto.

In FIGS. 1 to 18, the shaded portion E shown on the skin forming pieces 2 to 5 indicates the decorated surface A side of the fabric skin.

Figure 2:
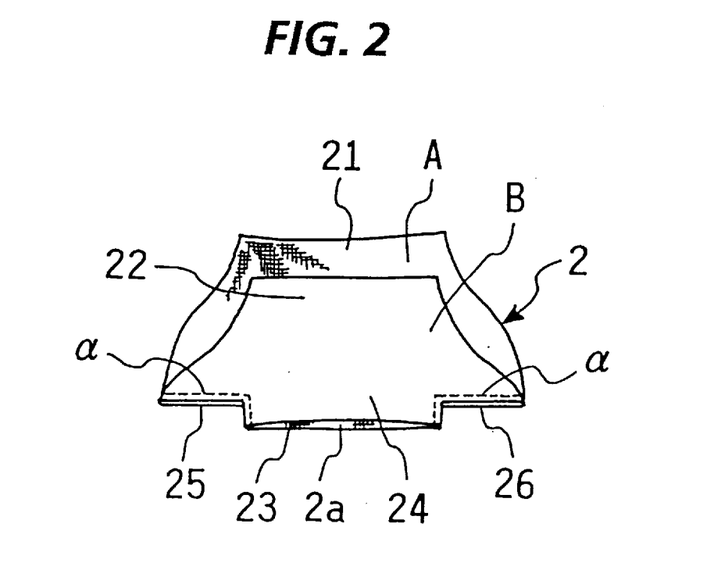
FIG. 2 is a perspective view showing the back side of a skin forming piece prepared by stitching small skin forming pieces.

When the skin forming pieces 2 to 5 have been prepared, the middle portions 23, 24 are overlapped one upon another in such a manner that the decorated surfaces A of the small skin forming pieces 21, 22 confront each other. Then, both confronting end edge portions 25, 26 are stitched in such a manner that the outlet seams thereof are provided on the back side of the skin, as shown in FIG. 2. L-shaped seams α (in lock stitches) are formed along both side edges of the middle portions 23, 24 with the upper edges thereof left unjoined.

Figure 3:
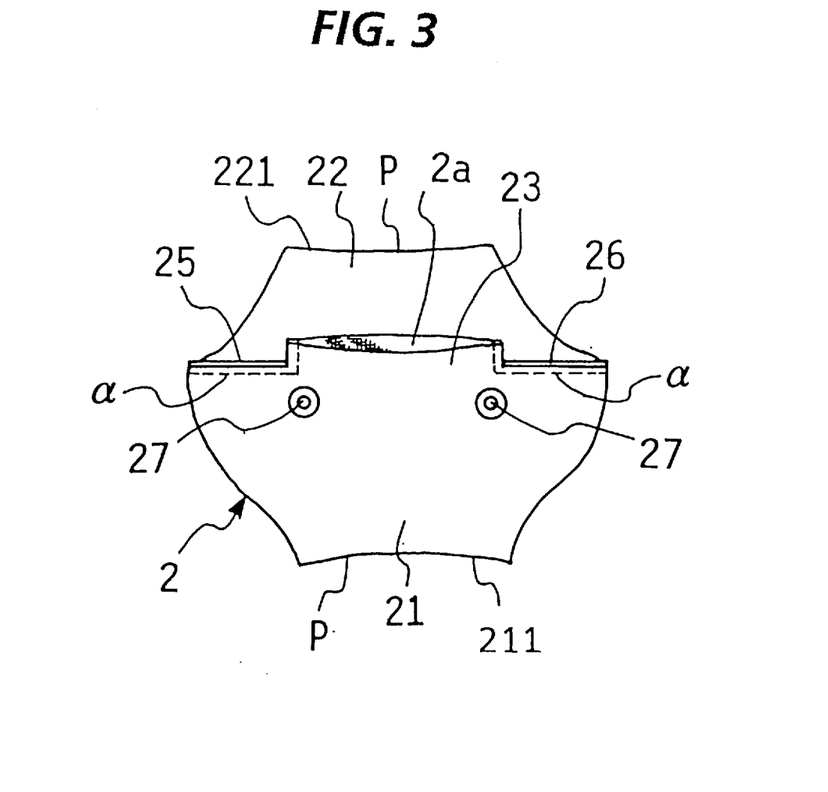
FIG. 3 is a perspective view showing the back sides of the skin piece formed by stitching small skin forming pieces.

After the seams a have been formed at two positions on both sides, both the small skin forming pieces 21, 22 are opened apart to form the skin forming piece 2, as shown in FIG. 3. An opening 2a that serves also as a foaming agent G charging port is formed between the middle portions 23, 24 of the small skin forming pieces 21, 22 of the skin forming piece 2 with the seams α extending only on both sides excluding the middle portion.

Figure 4:
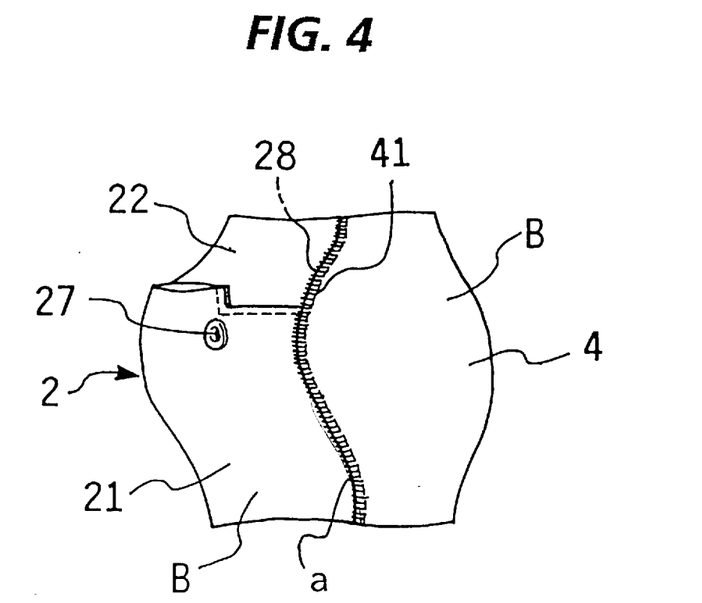
FIG. 4 is a perspective view of the stitched skin forming pieces.

Then, a side edge 41 of the skin forming piece 4 is overlapped on one side edge 28 of the skin forming piece 2 that is adjacent to the side edge 41, and both side edges 28, 41 are stitched with a thread, as shown in FIG. 4. A seam "a" formed by a sewing machine is shown in FIG. 4.

There are many stitching types. The skin forming pieces of this embodiment are joined by over-lock stitching except for the rims of the middle portions 23, 24. The over-lock stitching is advantageous in that a large joining force can be given to the skin forming pieces because the stitches are formed with the thread in the needle and looper threads surpassing the opening end edges of the skin forming pieces 2 to 5 while tightly engaged with one another. As a result, the leakage of the foaming agent at the time of foaming can be prevented.

Figure 5:
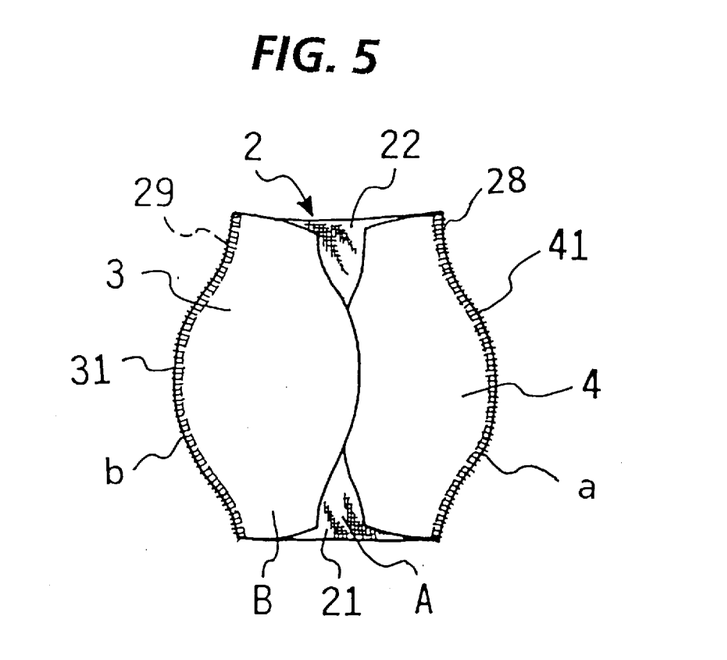
FIG. 5 is a perspective view of the stitched skin forming pieces.

In addition, a side edge 31 of the skin forming piece 3 is overlapped on the other side edge 29 of the skin forming piece 2 in such a manner that the decorated surfaces of both skin forming pieces confront each other, and the side edges 29, 31 are thereafter over-lock-stitched while exposing the outlet seams thereof to the back side of the skin to form a seam "b", as shown in FIG. 5.

Figure 6:
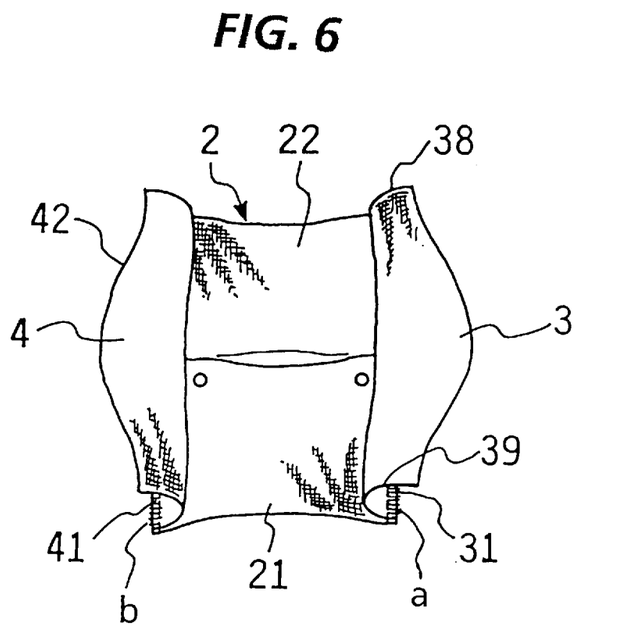
FIG. 6 is a perspective view of the stitched skin forming pieces.
Figure 7:
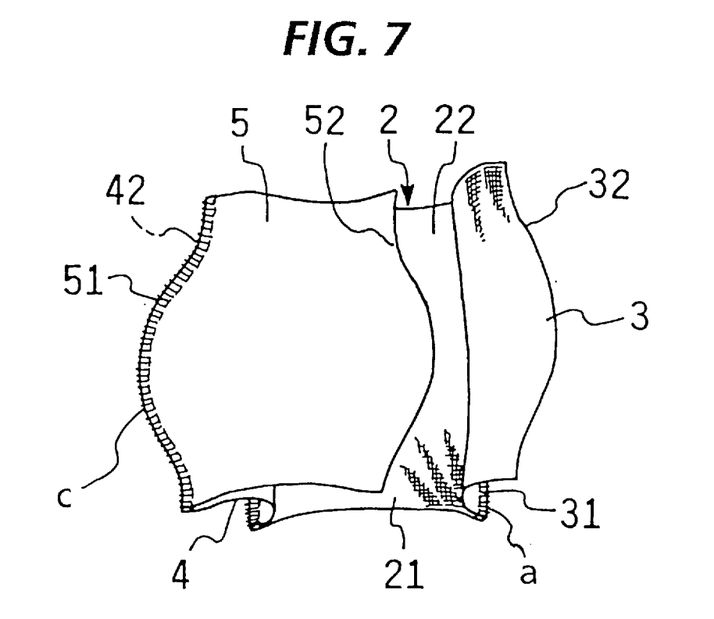
FIG. 7 is a perspective view of the stitched skin forming pieces.
Figure 8:
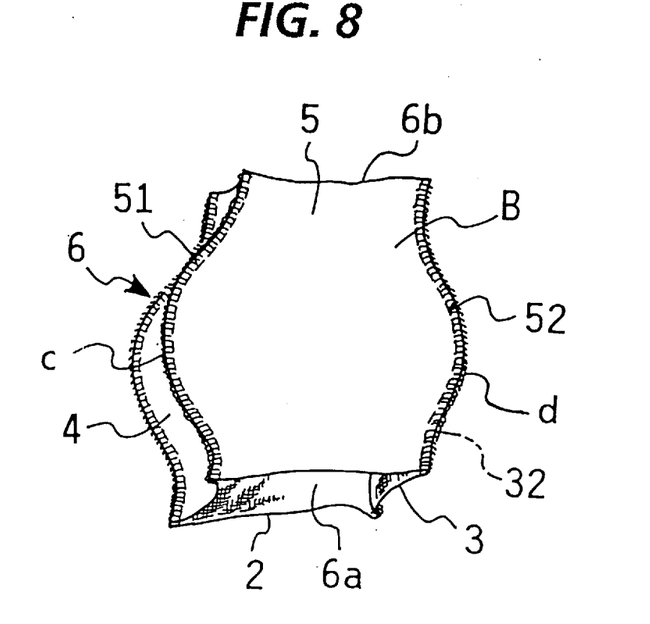
FIG. 8 is a perspective view of a skin body arranged inside out.

The thus stitched skin forming pieces 2, 3, and 4 are reversed and opened apart so that the front sides thereof face outward, as shown in FIG. 6, and one side edge 51 of the skin forming piece 5 is overlapped on a side edge 42 of the skin forming piece 4 in such a manner that the decorated surfaces of the skin forming pieces confront each other. Then, the side edges 42, 51 are over-lock-stitched to form a seam "c", as shown in FIG. 7. Similarly, the other side edge 52 of the skin forming piece 5 and a side edge 32 of the skin forming piece 3 are stitched to form a seam "d". As a result, a cylindrical skin body 6 arranged inside out as a whole is formed as shown in FIG. 8.

All the outlet seams of the skin forming pieces 2 to 5 are provided on the back side B of the skin as a result of the above stitching operation.

Figure 9:
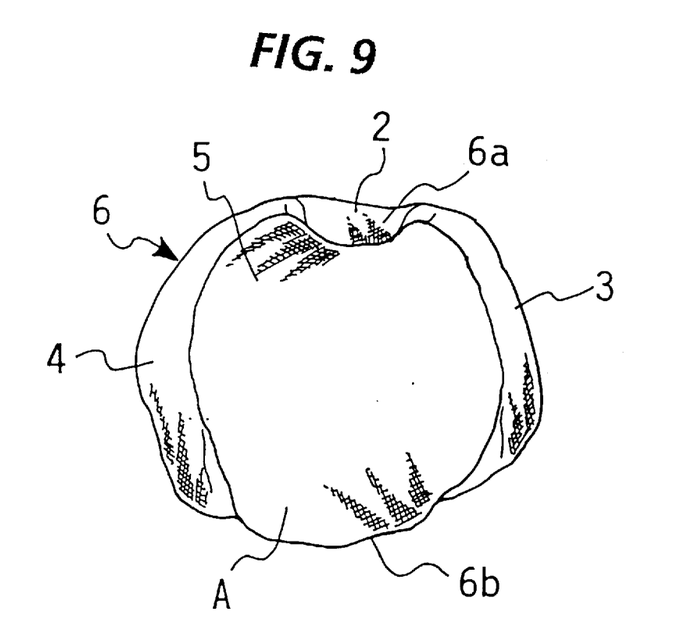
FIG. 9 is a perspective view of a skin body that is reversed so that the front side thereof faces outward.

Then, opening end edges that form one opening 6b are folded into the other opening 6a to arrange the cylindrical skin body 6 so that the front side of the skin body 6 faces outward, as shown in FIG. 9. The cylindrical skin body 6 with the decorated surfaces A facing outward is then collapsed, so that the cylindrical skin body 6 is folded up in doughnutlike form as shown in FIG. 10.

Figure 10:
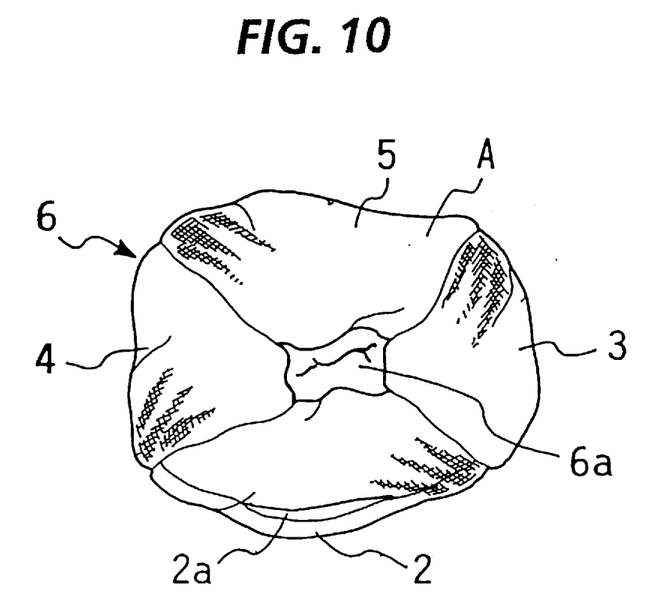
FIG. 10 is a plan view of the skin body collapsed from above.
Figure 11:
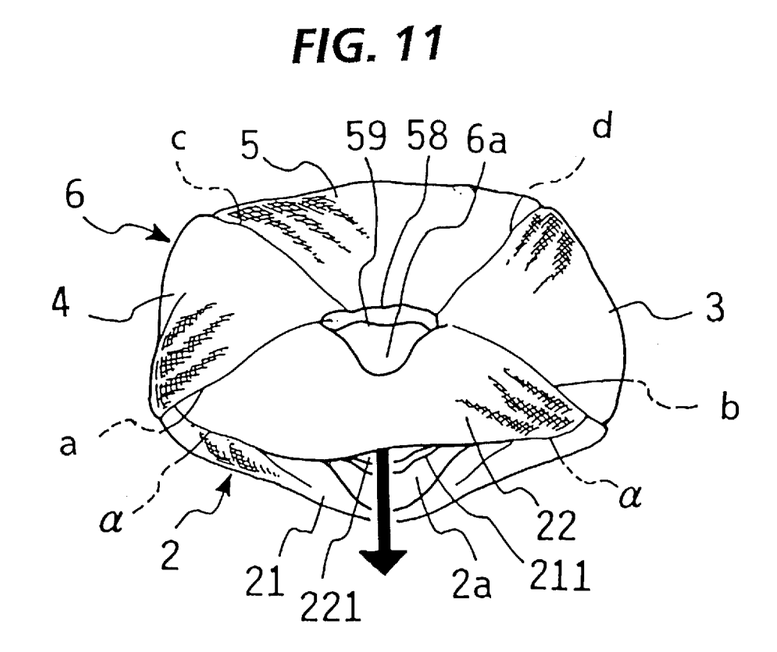
FIG. 11 is a perspective view of the skin body with opening end edges of the skin forming pieces pulled out of the opening inside out.
Figure 12:
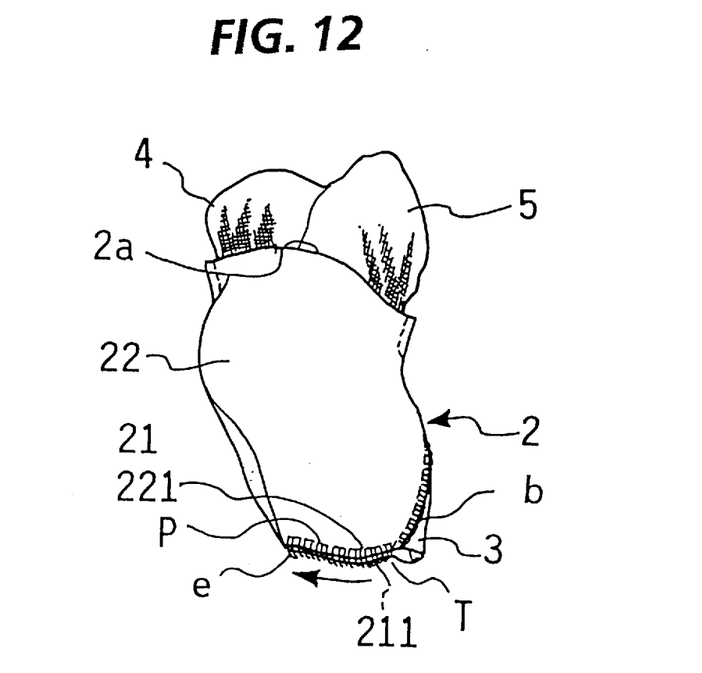
FIG. 12 is a perspective view showing the process of stitching the skin forming pieces along the rims thereof by overlapping both opening end edges thereof.

When a form such as shown in FIG. 10 has been prepared, one puts a hand through the opening 2a to thereby pick up the confronting portions of the opening end edges 211, 221 of the small skin forming pieces 21, 22 and pull such confronting portions out of the opening 2a as shown in FIG. 11. When pulled out, the confronting portions are aligned at a position P in the middle, and the overlapped opening end edges 211, 221 are over-lock-stitched in the direction indicated by the arrow as shown in FIG. 12. It may be noted that the operation of pulling the opening end edges 211, 221 out can be performed smoothly if the small skin forming pieces 21, 22 are turned up in advance as shown in FIG. 12.

Figure 18:
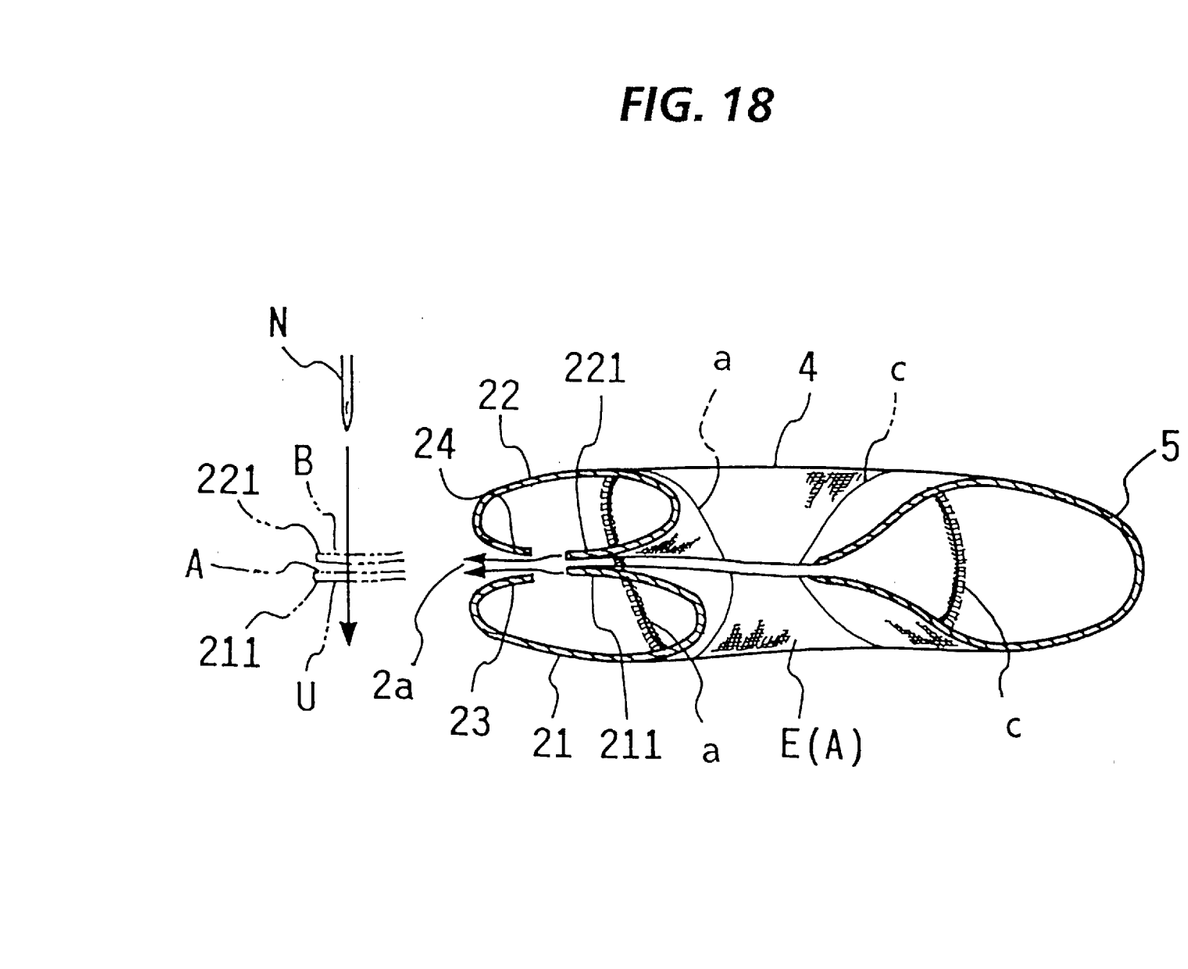
FIG. 18 is a longitudinal sectional view of FIG. 11.

Since the small skin forming pieces 21, 22 along the opening end edges 211, 221 are pulled so as to be reversed, such pulling operation causes the decorated surfaces A to confront each other automatically, as shown in FIG. 18, and when a seam (e) is formed by over-lock stitching, the outlet seam is arranged on the back side B of the skin without fail. Since the opening end edges 211, 221 are overlapped one upon another neatly and flatly as shown in FIG. 18, their confronting portions can be stitched easily with an ordinary sewing machine. In FIG. 18, reference character N denotes the needle of a sewing machine. In the process shown in FIG. 11, one may pull the opening end edges of the skin forming pieces 3 to 5 other than the skin forming piece 2 out of the opening 2a first with such an opening end edges arranged inside out. However, such operation becomes more cumbersome than the operation of pulling the opening end edges of the skin forming piece 2 out because in such an operation the opening end edges of the skin forming piece 2 go away from the opening 2a.

In this embodiment, the opening end edges 211, 221 of the skin forming pieces 21, 22 that are overlapped one upon another are stitched in the direction indicated by the arrow from the contact point between the seam (b) of the skin forming pieces 2, 3 and the opening end edge of the skin forming piece 2 as a starting point T as shown in FIG. 12.

Figure 13:
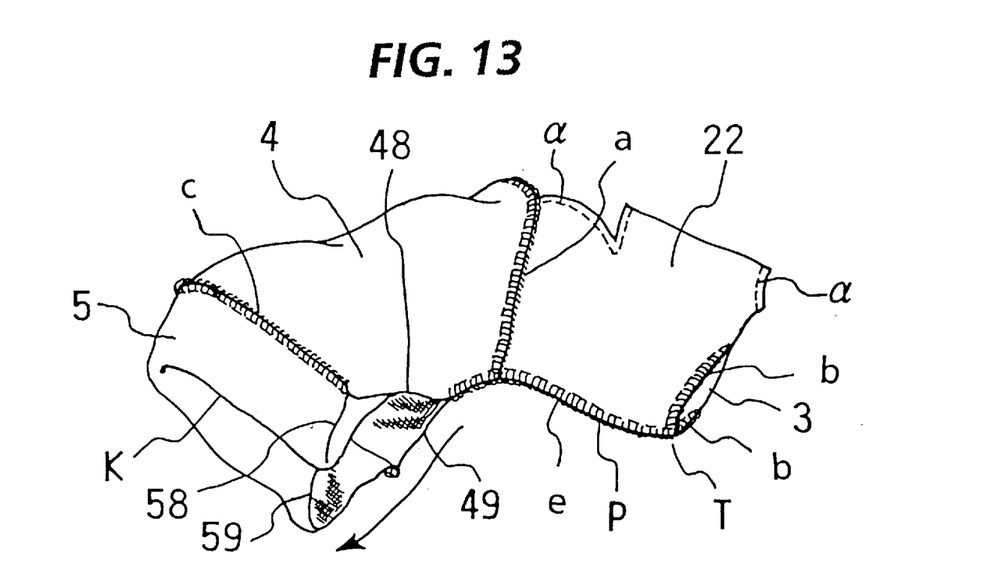
FIG. 13 is a perspective view showing the process of stitching the skin forming pieces along the rims thereof by overlapping both opening end edges thereof.

The confronting portions of the opening end edges 48, 49, 58, 59, 38, 39 of the remaining skin forming pieces 4, 5, and 3 are successively pulled out of the opening 2a as the seam (e) for the opening end edges 211, 221 of the skin forming piece 2 has been formed with the sewing thread, as shown in FIG. 13. Then, the confronting portions of the opening end edges 48, 49, the confronting portions of the opening end edges 58, 59, and further the confronting portions of the opening end edges 38, 39 are overlapped one upon another and then joined with the sewing thread while arranged inside out. The seam extends in the direction indicated by the arrow in FIG. 13.

Figure 14:
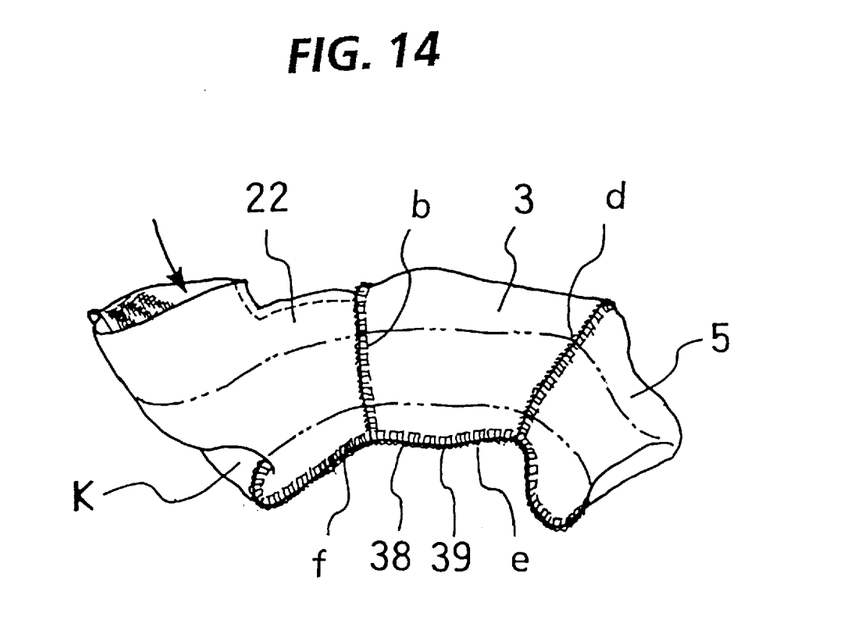
FIG. 14 is a perspective view showing the process of stitching the skin forming pieces along the rims thereof by overlapping both opening end edges thereof.

When the seam has made a round and come back to the starting point, the seam is superimposed to prevent fraying as indicated by f in FIG. 14. When the confronting portions of the opening end edges of the skin forming pieces 2 to 5 of the cylindrical skin body 6 are joined over the entire part of the cylindrical skin body 6 as shown in FIG. 14, the cylindrical skin body 6 is transformed into an annular doughnutlike skin body 7.

Once the confronting portions of the opening end edges of the respective skin forming pieces 2 to 5 have been joined together, these skin forming pieces that have been pulled out are pushed back via the opening 2a as described above.

Figure 15:
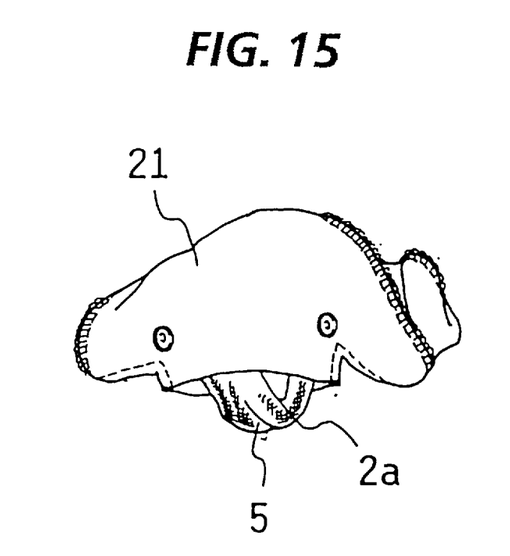
FIG. 15 is a perspective view showing the process of reversing the annular skin body prepared in FIG. 14 so that the front side thereof faces outward.

Specifically, one puts a hand through the opening 2a again as indicated by the arrow in FIG. 14 and pulls the respective skin forming pieces 2 to 5 out as shown in FIG. 15. The operation of pulling the skin forming pieces 2 to 5 out is performed with the skin forming piece 5 that is in the deepest first in order to quicken the operation in this embodiment. However, this operation may be started with the skin forming piece 4 or the like that is closer to the opening of the skin forming piece 2.

Figure 16:
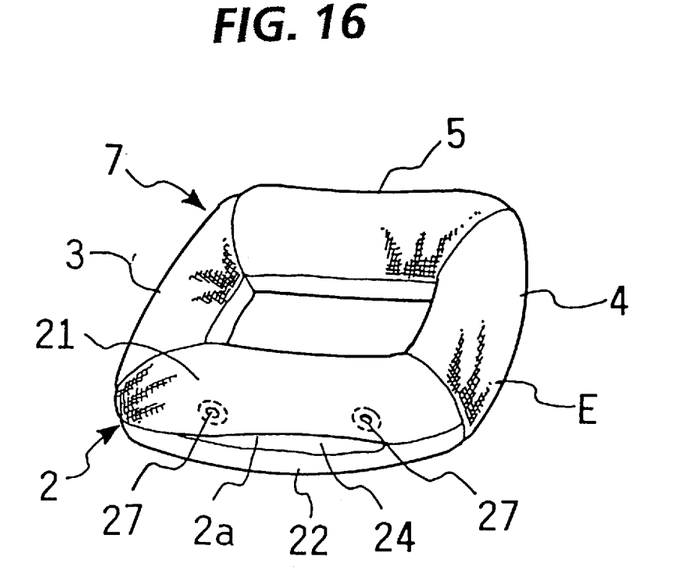
FIG. 16 is a perspective view of the annular skin body with the front side coming out completely from the state shown in FIG. 15.

When all the skin forming pieces 2 to 5 have been pulled out of the opening 2a and arranged so that the front sides thereof face outward, a hollow, doughnutlike skin body 7 having an annular cross section such as shown in FIG. 16 is formed. The outlet seam is arranged on the back side B of each of the skin forming pieces 2 to 5, which means that the outlet seams are concealed in the annular skin body 7, i.e., the outlet seams do not appear on the decorated side A of the annular skin body 7. As a result, a good-looking skin body 7 has been prepared.

The annular skin body 7 has been finished at this stage of the process. In this embodiment, the opening 2a is further subjected to a process before the skin body 7 is formed into a final skin for foamed product with skin.

Figure 17:
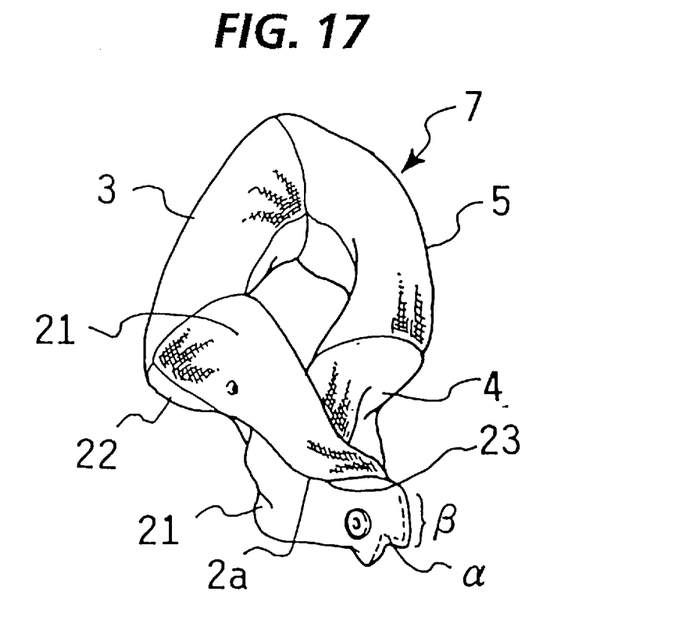
FIG. 17 is a perspective view of the annular skin body with the middle portion thereof, which is the opening, being arranged inside out.
Figure 19:
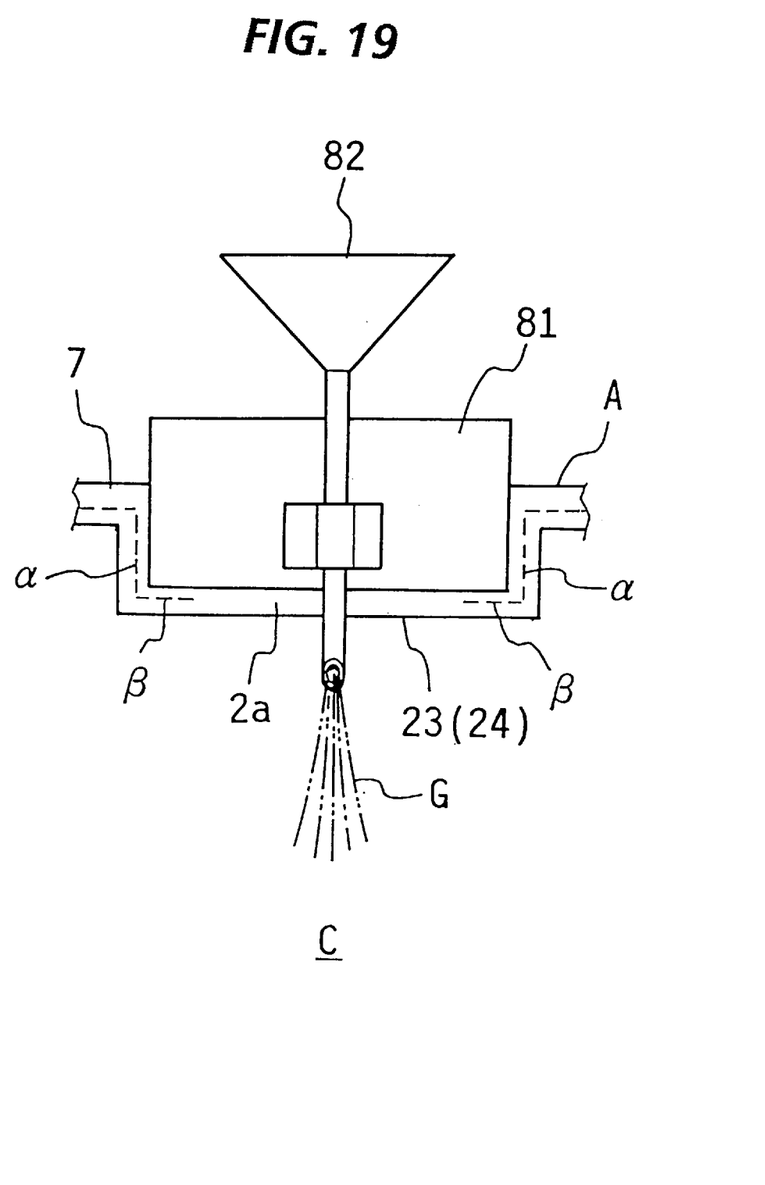
FIG. 19 is a front view of a setting jig and funnel inserted into the opening.

The opening 2a is formed between the middle portions 23, 24 that project in rectangular form of the small skin forming pieces 21, 22 as described above as shown in FIG. 2. Here the middle portions 23, 24 are arranged inside out at the opening 2a, and the opening 2a is slightly narrowed; i.e., a seam β is formed with lock stitches on the upper end edges of the middle portions as shown in FIGS. 17 and 19.

The seam A helps fix the setting jig 81 (see FIG. 19) during foaming. In addition, the opening 2a serving as a foaming agent G charging port is positioned one step lower than the position of the decorated surface A. The opening 2a being located at a concealed position thus contributes to giving a product high quality as shown in FIG. 19.

Thus prepared is a skin 13 for foamed product, which is characterized as forming the outlet seams so as to be concealed from the decorated surface A through the stitching operation, performed not by a special sewing machine such as a spot sewing machine but by an ordinary sewing machine, and further as having the opening 2a that is helpful in foaming.

A method of manufacturing a foamed product with skin using the skin 13 for foamed product will be described next.

First, the stay 12 (see FIG. 20) is set in the skin 13. The stay 12, which is U-shaped, is arranged in the skin 13 so that the legs 121, 121 project from the through holes 27 of the skin while inserted into the skin 13 from the opening and turned in a circumferential direction as shown in FIG. 1.

The foaming agent setting jig 81 is thereafter inserted into the middle portions 23, 24 at which the opening 2a is slightly narrowed by the seam β as shown in FIG. 19. The foaming agent G (e.g., a polyurethane foam agent) is charged into an annular closed space C of the annular skin body 7 from the funnel 82 arranged on the setting jig 81.

After the skin 13, the stay 12, and the like have been set in a foaming mold (not shown) and the mold has been closed, a foamed body Y integrated with the skin 13 and the stay 12 is formed. It may be noted that the foaming agent G may be charged into the skin body 7 for foaming after the skin 13 and the stay 12 have been set in the foaming mold.

After the foaming, the foaming mold is separated so that the foamed product integrated with the skin 13 and the stay 12 is taken out. Then, after having removed the setting jig 81 and the funnel 82, the longitudinal cross section of the foamed product is as shown in FIG. 20. A headrest 1, which is a desired foamed product with skin in which the skin 13 and the stay 12 are integrally attached to the foamed body Y, is prepared.

According to the thus organized method of manufacturing a skin for foamed product and a foamed product with skin, the joined portions of the side edges of the skin forming pieces 2 to 5 and the joined portions of the confronting portions of the opening end edges thereof are flat at the time of joining. Therefore, the joining operation is easy and can be completed simply as well as quickly by stitches formed by a general purpose sewing machine or the like. Since the respective skin forming pieces 2 to 5 are joined inside out, the outlet seams of the joined portions are not exposed on the decorated surface A of the skin 13 arranged with the front side thereof facing outward. As a result, the skin 13 is not only neat but also of high quality.

Further, the method of manufacturing a skin for foamed product requires that the skin forming pieces be arranged inside out and vice versa, and this makes the presence of an opening a requisite. Since the opening can be used also as the foaming agent G charging port, the presence of the opening is valuable. Still further, since the foaming agent G charging port is required for a skin used for skin integrated foaming and the size of the charging port is adequate for the reversing and the like of the skin forming pieces 2 to 5, there is no need for additionally arranging the opening in the skin 13, which does not entail additional labor nor impairs the appearance of the product.

According to the method of manufacturing a foamed product with skin using the above skin 13, the outlet seams are not exposed on the decorated surface, and the skin integrated foaming can be implemented simply as well as easily without using fasteners or the like but using the opening 2a as the foaming agent G charging port. Therefore, the method is extremely beneficial for the manufacture of foamed products with skin such as headrests.

Still further, in this embodiment, a baglike body is formed by seams α and β, and the opening 2a is concealed one step deeper from the decorated surface A. Therefore, the foaming agent G setting jig 81 can be attached easily. Still further, foaming is effected with the middle portions 23, 24 arranged inside the skin of the annular skin body 7. Therefore, the middle portions are brought into pressure contact with each other by foaming pressure, which in turn makes the opening easy to close.

Since it is, of course, possible to implement skin integrated foaming, the so-called "after-foaming skin covering method", in which a skin is integrated after foaming, can be dispensed with. In addition, by integrating the skin 13 with the foamed body Y, the skin 13 is free from wrinkles, and the labor-saving operation can be implemented as well. Moreover, high quality products can be produced.

It may further be noted that the invention is not limited to the aforementioned embodiment, but may be modified in various modes according to the object and use within the scope and spirit of the invention. The shape, size, material, and the like of the skin 13, the skin forming pieces 2 to 5, the opening 2a, the cylindrical skin body 6, the annular skin body 7, the foamed body Y, and the like may be selected appropriately. While it is by stitching that the skin forming pieces and the confronting portions of the opening end edges of the skin forming pieces are joined together in the aforementioned embodiment, these members may be joined by an adhesive or by heating such as high frequency heating or ultrasonic heating. It goes without saying that the foamed product with skin includes not only headrests, but also all other foamed products with skin and skins used for such products.

As described in the foregoing, the method of manufacturing a skin for foamed product as well as the method of manufacturing a foamed product with skin according to the invention are characterized in that the skin can be prepared in a simple way without much labor using an ordinary sewing machine and that all the seams including the outlet seams are arranged on the back side of the skin. Therefore, the skin manufactured by the method of the invention is extremely satisfactory in terms of quality, manufacturing cost, and the like as a skin for use in skin integrated foaming. In addition, foamed products using such skin are naturally of high quality. The invention can provide such great advantages.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of manufacturing a skin for a foamed product with skin, comprising the steps of:

(a) defining a skin for an outer covering of an annular foamed body into a plurality of cylindrical skins in radial directions and cutting apart each defined cylindrical skin at a single position along a circumference thereof to prepare a plurality of flat skin forming pieces, and forming a first opening in one of the flat skin forming pieces;

(b) forming a skin body having two ends by overlapping adjacent flat skin forming pieces one upon another in such a manner that decorated surfaces of the adjacent flat skin forming pieces confront each other, and joining side edges of the adjacent flat skin forming pieces together such that second and third openings, each having opening end edges, are formed at each end of said skin body; and (c) reversing the skin body so that a front side thereof faces outward, thereafter joining confronting portions of the opening end edges of the second and third openings of the skin forming pieces of the skin body together after the opening end edges have been pulled out via the first opening inside out, and pushing the confronting portions back via the first opening to thereby form an annular skin body having a closed cross section with the front side thereof facing outward.

2. A method of manufacturing a skin for a foamed product with skin according to claim 1, wherein the skin is made of fabric skin; and the skin forming pieces and the confronting portions thereof are joined together by stitching.

3. A method of manufacturing a skin for a foamed product with skin according to claim 1, wherein one of the skin forming pieces is formed by joining two small skin forming pieces, each having a middle portion on a confronting edge side thereof projected; and the first opening is formed between the middle portions of the two small skin forming pieces with the middle portions of the two small skin forming pieces unjoined.

4. A method of manufacturing a foamed product with skin, comprising the steps of:

(a) defining a skin for an outer covering of an annular foamed body into a plurality of cylindrical skins in radial directions and cutting apart each defined cylindrical skin at a single position along a circumference thereof to prepare a plurality of flat skin forming pieces, and forming a first opening in one of the flat skin forming pieces;

(b) forming a skin body having two ends by overlapping adjacent flat skin forming pieces one upon another in such a manner that decorated surfaces of the adjacent flat skin forming pieces confront each other, and joining side edges of the adjacent flat skin forming pieces together such that second and third openings, each having opening end edges, are formed at each end of said skin body;

(c) reversing the skin body so that a front side thereof faces outward, thereafter joining confronting portions of the opening end edges of the second and third openings of the skin forming pieces of the skin body together after the opening end edges have been pulled out via the first opening inside out, and pushing the confronting portions back via the first opening to thereby form an annular skin body having a closed cross section with the front side thereof facing outward; and (d) charging a foaming agent into the annular skin body to implement skin integrated foaming.

5. A method of manufacturing a foamed product with skin according to claim 4, wherein the first opening is used as a foaming agent charging port.

6. A method of manufacturing a foamed product with skin according to claim 4, wherein the foamed product is a headrest.

7. A method of manufacturing a skin for a foamed product with skin, comprising the steps of:

(a) defining a skin for an outer covering of an annular foamed body into a plurality of cylindrical skins in radial directions and cutting apart each defined cylindrical skin at a single position along a circumference thereof to prepare a plurality of flat skin forming pieces;

(b) cutting one of said plurality of flat skin forming pieces substantially in the middle to form first and second skin forming pieces, the first and second skin forming pieces having projecting confronting rectangular edges;

(c) overlapping middle portions of the projecting confronting rectangular edges of the first and second skin forming pieces, and joining the confronting rectangular edges such that outlet seams are provided on a reverse side of the joined first and second skin forming pieces;

(d) opening the joined first and second skin forming pieces such that an opening is formed between middle portions of the joined first and second skin forming pieces, with the outlet seams extending only on both sides of the joined first and second skin forming pieces and excluding the middle portions of the joined first and second skin forming pieces;

(e) overlapping a side edge of a third skin forming piece on a side edge of the joined first and second skin forming pieces, and joining the side edges together;

(f) overlapping a side edge of a fourth skin forming piece on a side edge of the joined first and second skin forming pieces, and joining the side edges together to form a skin body;

(g) reversing the skin body so that a front side thereof faces outward;

(h) overlapping a side edge of a fifth skin forming piece on a side edge of the third skin forming piece, and joining the side edges together;

(i) joining another side edge of the fifth skin forming piece and a side edge of the fourth skin forming piece, forming a skin body arranged inside out;

(j) folding opening edges that form an aperture at one end of the cylindrical skin body into another aperture formed at another end of the cylindrical skin body, so that a front side of the cylindrical skin body faces outward;

(k) collapsing the cylindrical skin body into a doughnut-like shape;

(l) pulling out confronting portions of opening end edges of the cylindrical skin body through the opening such that the confronting portions are aligned at a middle position, and joining overlapped end edges of the confronting portions; and (m) pushing the confronting portions back via the opening to thereby form an annular skin body having a closed cross section with a front side thereof facing outward.

8. A method of manufacturing a skin for a foamed product with skin according to claim 7, wherein the skin is made of fabric skin, and the first, second, third, fourth, and fifth skin forming pieces and the confronting portions thereof are joined together by stitching.

9. A method of manufacturing a skin for a foamed product with skin according to claim 8, wherein the stitching is over-lock stitching.

10. A method of manufacturing a skin for a foamed product with skin according to claim 7, wherein the opening is used as a foaming agent charging port.

11. A method of manufacturing a skin for a foamed product with skin according to claim 7, wherein the foamed product is a headrest.

* * * * *